US010475079B2

(12) United States Patent
Hagen et al.

(10) Patent No.: US 10,475,079 B2
(45) Date of Patent: Nov. 12, 2019

(54) APPLICATION INTEGRATED ADVERTISING DISPLAY CONTROL

(71) Applicant: Adobe Inc., San Jose, CA (US)

(72) Inventors: Carmel Hagen, New York, NY (US); Tobias Peggs, Princeton, NJ (US); Abraham M. Muchnick, Woodmere, NY (US); Israel Derdik, Cedarhurst, NY (US)

(73) Assignee: Adobe Inc., San Jose, CA (US)

(*) Notice: Subject to any disclaimer, the term of this patent is extended or adjusted under 35 U.S.C. 154(b) by 589 days.

(21) Appl. No.: 14/729,442

(22) Filed: Jun. 3, 2015

(65) Prior Publication Data
US 2015/0356615 A1 Dec. 10, 2015

Related U.S. Application Data

(60) Provisional application No. 62/009,038, filed on Jun. 6, 2014.

(51) Int. Cl.
G06Q 30/00 (2012.01)
G06Q 30/02 (2012.01)
G06T 11/60 (2006.01)

(52) U.S. Cl.
CPC ......... *G06Q 30/0267* (2013.01); *G06T 11/60* (2013.01); *G06T 2200/24* (2013.01)

(58) Field of Classification Search
CPC .. G06Q 30/0267; G06T 11/60; G06T 2200/24
See application file for complete search history.

(56) References Cited

U.S. PATENT DOCUMENTS

| 8,380,005 B1* | 2/2013 | Jonsson | G06T 11/60 382/282 |
| 2002/0062252 A1* | 5/2002 | Van Zoest | G06Q 30/0225 705/14.26 |
| 2003/0139840 A1* | 7/2003 | Magee | D06B 11/0059 700/133 |
| 2004/0015398 A1* | 1/2004 | Hayward | G06Q 30/02 705/14.49 |

(Continued)

OTHER PUBLICATIONS

McDermott,"Aviary Launches Advertising Stickers for its Photo-Editing service", Advertising Age, Apr. 16, 2013, 2 pages.

Primary Examiner — Bennett M Sigmond
Assistant Examiner — Scott C Anderson
(74) Attorney, Agent, or Firm — SBMC

(57) ABSTRACT

Application integrated advertising display control techniques are described. In one or more implementations, a request is detected, which is received by the one or more computing devices from a client device via a network, for receipt of one or more image editing content packages that are branded to correspond to one or more advertisers. The one or more image editing content packages include functionality usable as part of an image editing process to alter appearance of pixels in an image but not replace the pixels or functionality usable to supplement additional pixels to the image without replacing the pixels in the image. Responsive to the detecting by the one or more computing devices, streaming is controlled of the one or more content packages that are branded to correspond to the one or more advertisers via the network for receipt by the client device.

20 Claims, 11 Drawing Sheets

(56) References Cited

U.S. PATENT DOCUMENTS

| | | | |
|---|---|---|---|
| 2005/0195157 A1* | 9/2005 | Kramer | G06F 3/04845 |
| | | | 345/156 |
| 2006/0181547 A1* | 8/2006 | Loo | H04N 7/147 |
| | | | 345/619 |
| 2008/0148411 A1* | 6/2008 | Murakami | G06F 21/572 |
| | | | 726/26 |
| 2008/0209311 A1* | 8/2008 | Agronik | G06F 17/30893 |
| | | | 715/234 |
| 2008/0215725 A1* | 9/2008 | Backer | G06Q 30/0205 |
| | | | 709/224 |
| 2010/0057747 A1* | 3/2010 | Schouten | G06Q 30/0242 |
| | | | 707/E17.001 |
| 2010/0157989 A1* | 6/2010 | Krzyzanowski | G06F 9/4445 |
| | | | 370/352 |
| 2012/0151202 A1* | 6/2012 | Clerc | G06F 12/02 |
| | | | 713/2 |
| 2013/0120439 A1* | 5/2013 | Harris | G11B 27/034 |
| | | | 345/619 |
| 2013/0346226 A1* | 12/2013 | Nunes | G06Q 30/0605 |
| | | | 705/26.2 |

* cited by examiner

1000

1002
Detect a request, received by the one or more computing devices from a client device via a network, for receipt of one or more image editing content packages that are branded to correspond to one or more advertisers

1004
The one or more image editing content packages include functionality usable as part of an image editing process to alter appearance of pixels in an image but not replace the pixels or functionality usable to supplement additional pixels to the image without replacing the pixels in the image

1006
Responsive to the detecting by the one or more computing devices, control streaming of the one or more content packages that are branded to correspond to the one or more advertisers via the network for receipt by the client device

Fig. 10

APPLICATION INTEGRATED ADVERTISING DISPLAY CONTROL

RELATED APPLICATIONS

This application claims priority under 35 USC Section 119(e) to U.S. Provisional Patent Application No. 62/009,038, filed Jun. 6, 2014, and titled "Application-Integrated Advertising Display," the entire disclosure of which is hereby incorporated by reference.

BACKGROUND

Display of advertisements is a prevalent technique used to monetize a variety of different activities, such as time spent consuming content. Conventional techniques used to display advertising, however, are largely avoided if at all possible by users. For example, banner advertisements included along with a display of a webpage are typically not explored by a user when interacting with a webpage. Likewise, video advertisements output before start of a video may be ignored by looking elsewhere for the fifteen seconds involved in output of the advertisement in order to watch the video.

Thus, a common characteristic in these conventional techniques is that the advertisements are thought of by a user as interfering with a desired experience, which may be frustrating to the user and achieve an unwanted effect of a user actually trying to avoid a brand associated with the advertisement due to an association of that interruption with the advertiser.

SUMMARY

Application integrated advertising display control techniques are described. In one or more implementations, a request is detected, which is received by the one or more computing devices from a client device via a network, for receipt of one or more image editing content packages that are branded to correspond to one or more advertisers. The one or more image editing content packages include functionality usable as part of an image editing process to alter appearance of pixels in an image but not replace the pixels or functionality usable to supplement additional pixels to be added to the image without replacing the pixels in the image. Responsive to the detecting by the one or more computing devices, streaming is controlled of the one or more content packages that are branded to correspond to the one or more advertisers via the network for receipt by the client device.

In one or more implementations, a system of application integrated advertising display control includes one or more computing devices having a service manager module implemented at least partially in hardware to perform operations. The operations include controlling deployment of one or more image editing content packages that are branded to correspond to one or more advertisers. The one or more image editing content packages are configured to operate as part of a content creation process involving editing of images by client devices. The operations also include monitoring data describing the deployment of the one or more image editing content packages. The data is indicative of downloads of the one or more image editing content packages and usage of the one or more image editing content packages. The operations further include exposing the monitored data describing the deployment of the one or more image editing content packages to the one or more advertisers.

In one or more implementations, a system of application integrated advertising display control includes a service manager module implemented at least partially in hardware. The service manager module is configured to control deployment of the one or more content packages that are branded to correspond to one or more advertisers via a network for receipt by client devices, the one or more image editing content packages including functionality usable as part of an image editing process to alter or supplement an appearance of pixels in an image without replacing the pixels.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2A shows an image editing mobile app on a mobile device after launch.

FIG. 2B shows an opt-in advertisement launch within the mobile app of 2A.

FIG. 2C shows an install screen of the advertising image editing content.

FIG. 10 is a flow diagram depicting a procedure in an example implementation describing application integrated advertising display control techniques.

DETAILED DESCRIPTION

Overview

Figure 1:
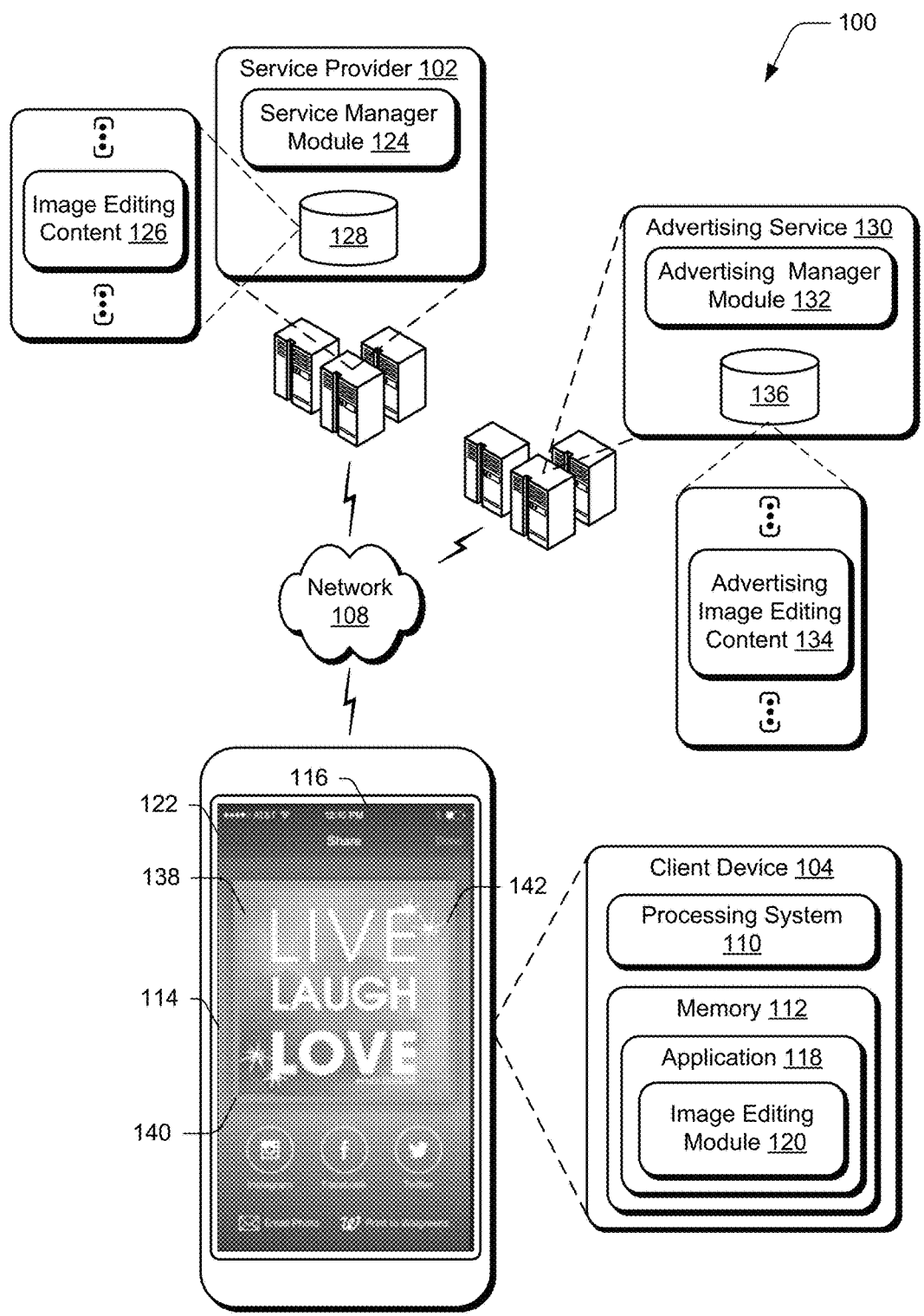
FIG. 1 is an illustration of an environment in an example implementation that is operable to employ application integrated advertising display control techniques described herein.

Various forms of advertising on web and mobile applications ("web apps" and "mobile apps") currently exist. Advertising may take the form of banners displayed at the top or bottom of pages in a mobile applications or may be even more interruptive. For example, conventional advertisements in some instances may take over the content that the user wants to view, such as video advertisements that block a user from being able to interact with content, e.g., a webpage. Other forms of display advertising are more "native," or integrated with the user's desired content. For example, social media sites such as Instagram® shows promoted images in a user's stream. The common element with display advertising is that it exists to monetize a consumption experience. In each of the examples above, the end users are consuming content on client devices (e.g., a mobile phone or tablet) and display of advertising is used as a way to monetize the time spent consuming that content.

Techniques are described that support application-integrated advertising display control, which may be performed as part of image editing. For example, users may be given access to a "store" that provides image editing content with which to embellish images being edited by the user. The image editing content is configurable in a variety of ways, such as packs of digital image filters, packs of digital image frames, packs of digital "stickers," and other packs with digital enhancements and embellishments, each of which can be installed and applied by a user to images as desired. Accordingly, in the following all such image editing and embellishment digital content will be referred to herein as "image editing content."

The image editing content may also be configured to include advertising image editing content, e.g., such that advertisers can create branded versions of the image editing content described above. A branded version of image editing content, for instance, may include logos, trademarks, various images, and promotional messages that are associated with things to be advertised, such as products, services, media or any other advertised subject matter. The inclusion of advertising image editing content as part of an image editing experience allows advertisers to communicate brand messages through several steps that engage the user in a creative process.

One benefit of integrating advertising into a creative process of image editing within an application is that the user is more involved than if the user were simply consuming content. For example, users of client devices such as mobile phones, tablets, "phablets," and so on may view advertisements while merely consuming content, like reading or looking at images, and thus may choose to ignore them in such a passive consumption instance. However, if users are actively engaged in creating enhanced images, the user may choose to select individual elements of image editing content. If such image editing content has a brand message, users are therefore selecting an element corresponding to that message as desired and without being forced to interact with that message as is required under conventional techniques. Further discussion of use and implementation of advertising image editing content as part of image editing content as part of a creative process of image editing is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a service provider 102, client device 104, and advertising service 130 that are communicatively coupled, one to another, via a network 108 and may be implemented in a variety of ways using computing devices.

The computing device that implements the client device 104, for instance may be configured as a mobile device having a housing a display device that is configured to be held by one or more hands of a user, such as a mobile phone, tablet computer, and so on. Other mobile examples such as laptops are also contemplated. Computing devices may also be configured as a desktop computer, game console, wearable device, and so on. Thus, computing devices may range from full resource devices with substantial memory and processor resources (e.g., personal computers, game consoles) to low-resource devices with limited memory and/or processing resources (e.g., video-consumption devices). Additionally, computing devices may be representative of a plurality of devices, such as multiple servers in a server farm utilized by a business to perform operations "over the cloud" as illustrated for the service provider 102 and the advertising service 106 as further described in relation to FIG. 12.

The client device 104 is illustrated as including a variety of hardware components, examples of which include a processing system 110, an example of a computer-readable storage medium illustrated as memory 112, a display device 114, and so on. The processing system 110 is representative of functionality to perform operations through execution of instructions stored in the memory 112. Although illustrated separately, functionality of these components may be further divided, combined (e.g., on an application specific integrated circuit), and so forth.

The display device 114 is illustrated as displaying an image 116 and includes an application 118 having an image editing module 120 that is representative of functionality to edit the image 116. The image editing module 120, for instance, may be incorporated as a module to form part of the application 118 to support functionality to edit the image 116, such as to change contrast, crop, apply filters, perform object removal, and so forth. For example, the image editing module 120 may be provided by a third party to a developer of the application 118 to add this functionality, such as to add image editing functionality to a social media application so that a user may edit images via a user interface 122 and then upload the images to a social network, as part of an application configured to make collages from images, and so forth. Other examples are also contemplated, such as configuration of the image editing module 120 as a dedicated image editing application.

The image editing module 120 is configured to communicate with a service manager module 124 of a service provider 102 via a network 108 to obtain image editing content 126 from storage 128. The service manager module 124 is representative of functionality to maintain, expose, and track deployment of image editing content 126 for availability via the network 108, e.g., as part of an online store. The image editing content 126 is usable as part of editing the image 116 by a user to alter appearance of the image 116, such as to use filters, effects, stickers, and so on as further described below. A user, for instance, may interact with the user interface 122 to specify which filters, effects, stickers, and so on are to be applied to the image 116 to achieve a desired image editing result as is generally understood by a person of ordinary skill in the art.

The service manager module 124 may also be configured to communicate with an advertising service 130 and corresponding advertising manager module 132 via the network 108 to obtain advertising image editing content 134 from storage 136. The advertising manager module 132 is representative of functionality to manage creation, deployment, and tracking of the advertising image editing content 134. As previously described, the advertising image editing content 134 is configured as branded versions of the image editing content 126 described above. A branded version of image editing content, for instance, may include logos, trademarks, various images, and promotional messages that are associated with things to be advertised, such as products, services, media or any other advertised subject matter. The inclusion of advertising image editing content 134 as part of an image editing experience allows advertisers to communicate brand messages through several steps that engage the user in a creative process.

Illustrated examples of advertising image editing content 134 include filters 138, frames 140, and stickers 142. Filters 138 support digital effects that vary the color, hue, saturation, tone, brightness, contrast, and other image values of all or part of an existing image 116. Frames 140 reference digital images that provide a border that is disposed around an area of the image 116. Stickers describe digital images comprising one or more of art, images, designs, or text, which can be accessible for users to place at a desired location on the image 116. Through configuration of the image editing content 126 as advertising image editing content 134, advertising is included as part of a creative process and thus rather than be viewed as something to avoid as in conventional advertising techniques the advertising image editing content 134 may be desired and sought out by a user for use in editing the image 116.

The service manager module 124 is also representative of functionality that supports analytics involving deployment of the advertising image editing content 134. The service manager module 124, for instance, may track when and to where the advertising image editing content 134 is streamed, e.g., in response to requests. The service manager module 124 may also be configured to track whether the advertising image editing content 134 is actually used by client devices 104 receiving the content.

For example, the service manager module 124 may embed functionality that is executed by the client device 104 and reports to the service provider 102 via the network 108 when the advertising image editing content 134 is used on the client device 104. This data collected by the service manager module 124 may then be exposed to the advertising service 130 to describe usage of the advertising image editing content 134, further discussion of which is included in the example procedures.

FIG. 2A depicts an example implementation 200 of an initial options screen of an image editing mobile app on a mobile phone that includes functionality of the image editing module 120 of FIG. 1. The mobile app can be implemented on another mobile device, such as a tablet computer or a laptop computer. In another alternative, the image editing app can be a web app, and it could run on a mobile or other electronic device configured to run a web app. In the implementation depicted, a subject image 202 is in the center of the options screen, within a "gallery" interface of the application. The gallery allows the user to select an image from, for example, existing images on the client device 104. Action options below include the ability to take another image 204, to edit the image 206, and to share the image 208. Action options at the top of the screen include the ability to print 210 or shop 212. It is contemplated that these options can be in any location on the screen, and that additional action options could be available.

Still referring to FIG. 2A, the image depicted in this implementation is an image of clouds that the user is selecting to edit in this application. In this implementation, the process to be described in the following steps begins with the user's selection of an image to edit. The primary use of the application in this implementation is to edit images, and the display of advertising content begins when the user begins a creative process with which advertising image editing content 134 of FIG. 1 can be integrated. It is contemplated that other creative processes within other applications could utilize advertising image editing content 134 integration as described herein.

FIG. 2B shows an example implementation 220 of the launch of an opt-in advertising screen. The acceptance of the advertisement by the user can lead to other screens in which integrated advertising image editing content is available. In an implementation described herein, the advertising image editing content 134 is integrated with the image editing content 126.

In the implementation depicted in FIG. 2B, the background shows an "image editing" interface 222 of the application darkened in contrast with the advertising screen 224 launch that appears to be imposed in front of the interface. Such an image of the advertising screen 224 may be referred to as a "promotional interstitial." In the implementation of the promotional interstitial shown, the word "NEW" 226 is displayed in a corner. It is contemplated that advertising campaigns used in accordance with the processes described herein will typically run for a set period of time and then be periodically replaced by new campaigns. Therefore, users may be alerted to new content associated with new campaigns. Alternatively, the word "NEW" may not be used.

In the implementation depicted, the user has a choice whether to accept 228 or decline 230 further information about the advertising image editing content 134, making further interaction with the advertisement only permissible on an opt-in basis. Implementations of this disclosure might only include opt-in promotional interstitials, which may create the benefit of a positive user experience from not forcing interaction with the advertising image editing content. However, it is contemplated that certain implementations may not require an opt-in on the promotional interstitial, or may not use a promotional interstitial at all as further described in relation to FIGS. 8A-8C. Such implementations may be used, for example, to support monetization of free applications, or to create dedicated versions of apps for certain ad campaigns.

FIG. 2C shows an example implementation 240 of an "install screen" 242 for one of several types of "packs" of image editing content. A "pack" is a sub-category of image editing content, including such content as filters, effects, text, frames, and "stickers.' As used herein, "stickers" describe digital images comprising one or more of art, images, designs, or text, which can be accessible for users to impose in any place on their images as previously described in relation to FIG. 1 and thus used to replace underlying pixels in the image as viewed by a user.

Still referring to FIG. 2C, the particular install screen depicted is for filters. Image filters are generally digital effects that vary the color, hue, saturation, tone, brightness, contrast, and other image values of all or part of an existing image. Here, the install screen 242 shows an advertisement for a soon-to-be released movie at the top of the screen, with promotional information such as the name of the movie, the release date, and information about the director. This image is one implementation of this disclosure, and will be referred to herein as the "main advertisement," and the image it contains will be referred to as the "main advertisement image." It is contemplated that a main advertisement may have no images or images, or more than one image or image as part of the ad.

As shown in this implementation, the main advertisement image itself has a filter applied to it, differentiating its color values from the original main advertising image in FIG. 2B on the promotional interstitial. In other implementations, a main advertisement image may not have a filter pre-applied.

Just below the main advertisement image are four more images 244-250. The image 244 furthest on the left is a thumbnail partial image of the main advertisement image, which may or may not have a filter applied. The three images 246-250 to the right are thumbnails of the user's selected image with different filters applied to each one. Below these four images 244-250 is the overall theme name 252 of the advertising image editing content 134. Below the theme name 252 is a description of the pack that would become available to the user upon selecting to install this pack. Here, the pack is for filters, or effects. In this implementation, the words "filters" and "effects" are used interchangeably, but ordinarily, "effects" can be used to describe digital enhancements that include more than just "filters." The description of the pack in the implementation depicted can be created by the advertiser, and include brand messaging consistent with the experience the advertiser intends to convey to the user.

Still referring to FIG. 2C, the install screen shows option buttons that allow the user to install or reject the pack of filters. In the implementation depicted, the install buttons are the two areas with the words "FREE," and the rejection button is the area with the word "CANCEL." In other implementations, the words may be different, and may be placed in alternate locations.

Figure 3B:
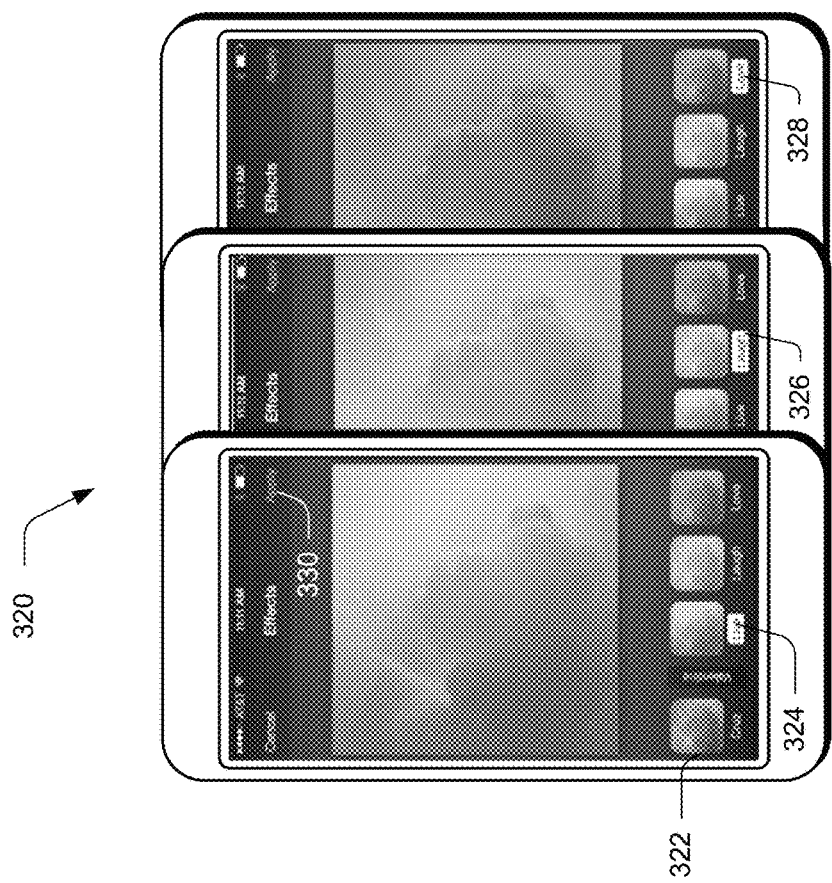
FIG. 3B shows three side-by-side comparisons of filter options.
Figure 3A:
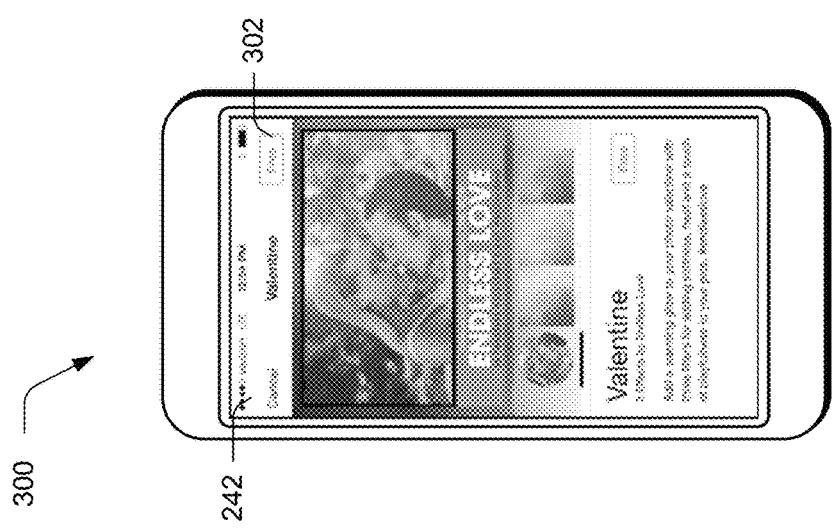
FIG. 3A shows the install screen of 2C, specifically depicting an install screen for filters.

FIGS. 3A and 3B show example implementations 300, 320 of a process that becomes available to the user once the filter pack is installed. FIG. 3A shows the install screen 242 as in FIG. 2C. Here, the user presses the "FREE" button 302 and the image editing content 126 is delivered to the user. In this case, three new filters are available to the user.

FIG. 3B shows three side-by-side versions of the user image when each of the three new filters is selected. The screen on the furthest left side of FIG. 2B shows a first of the new pack of filters selected. The majority of the screen depicts the user's selected image with the first filter imposed upon it as a preview. Below the selected image are four total options for filters. In the implementation depicted, the filter option 322 on the furthest left side is an existing filter from the application itself. The application may have several non-advertising-related filters available to users, such as a basic set that comes with the application. It is contemplated that this furthest left existing filter option 322 could be an advertising-related option from a previously installed advertising campaign.

The three filter options 324, 326, 328 to the right of the previously-existing filter option are the new filter options delivered to the user from the installation of the pack. In the implementation depicted, the new filter options 324-328 are separated from the existing filter by a vertically-oriented theme name of the advertising campaign, which indicates that the new filters to the right are associated with the theme. Other implementations may or may not include this theme name, or may associate the theme with the new filters in another manner.

The three filter options 324-328 associated with the theme have names that can be created by the advertiser, and represent brand messaging consistent with the experience the advertiser intends to convey to the user. It is contemplated that filter packs can include fewer or more than three filter options. Any filter options that are available to the user, whether previously-existing or new from a current ad campaign, can be made available to the user on a screen such as those in FIG. 3B by scrolling the filter options to the left or the right.

Still referring to 3B, the three side-by-side options 324-328 shown depict previews of each of the three new filter options. The filter option being previewed in each separate screen is indicated by the name of the particular filter being highlighted. In the implementation depicted, the user can apply the filter and move on to a next step by pressing the "Apply" button 330. The user can also cancel the filter selection process entirely and move back to a previous step, such as selecting another image.

Figure 4C:
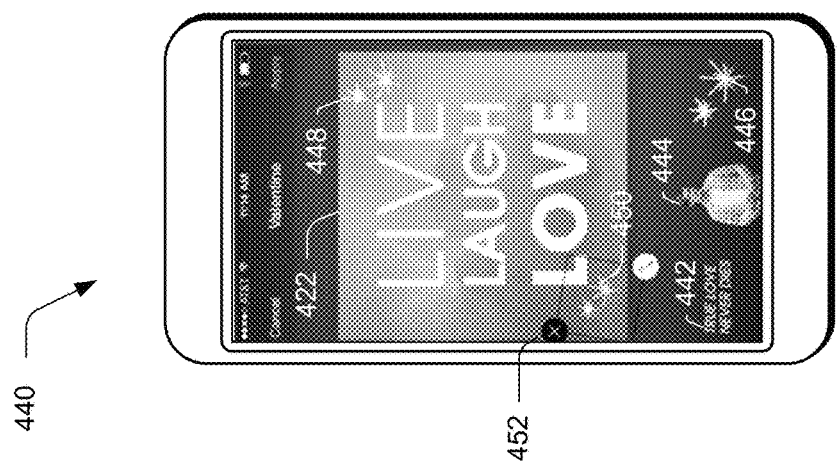
FIG. 4C shows a screen with a filter and several sticker options selected.
Figure 4B:
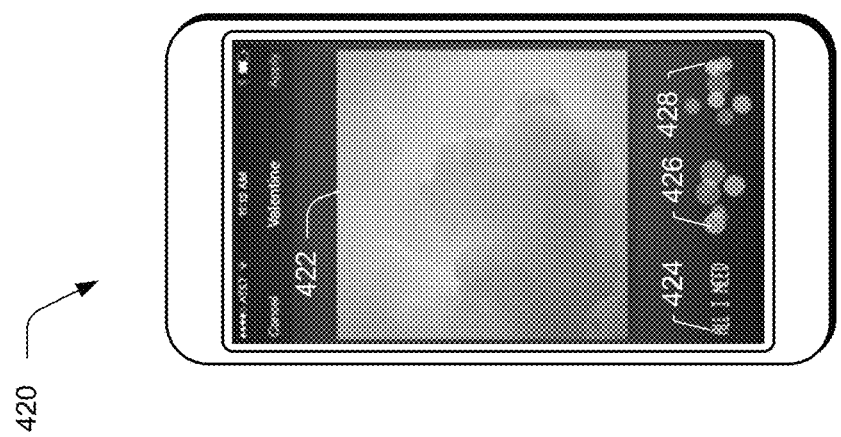
FIG. 4B shows a screen with a filter selected and sticker options that may be selected.
Figure 4A:
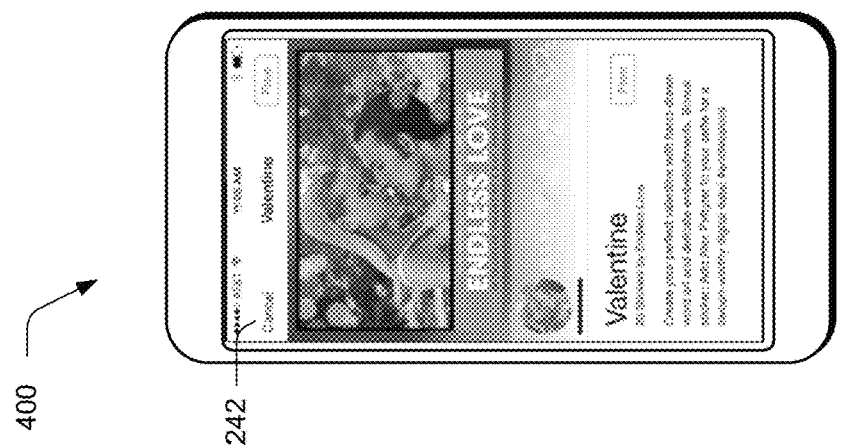
FIG. 4A shows an install screen of the advertising image editing content, specifically depicting an install screen for stickers.

Referring now to example implementations 400, 420, 440 of FIGS. 4A-4C, a process is shown for installing, previewing, and applying a pack of image editing content in a similar manner as the process shown in FIGS. 3A-3B. In the implementation depicted in FIG. 4A-4C, a pack of stickers is available to the user. In FIG. 4A, the layout of the install screen 242 for the sticker pack is similar to the layout of the install screen for the filter pack in FIG. 3A. It is contemplated that the layouts of the install screens could be orientated differently than each other, or that different packs of different kinds of image editing content could be made available on just one install screen.

In the implementation shown, the layout is similar to that in FIG. 3A, with the main advertisement on top, the same theme name just below, a thumbnail of the main advertisement image just below on the left, and thumbnails of several pack options to the right of the thumbnail of the main advertisement image. Here, though, the thumbnail options involve available stickers. Additionally, below the thumbnail options is a description of the stickers. The description of the stickers in the implementation depicted can be created by the advertiser, and include brand messaging consistent with the experience the advertiser intends to convey to the user. One benefit to having different install screens for different packs is that the advertiser can have more opportunities to present a tailored brand message to the user.

FIG. 4B depicts an implementation in which the user has installed the pack of stickers and the image editing content 126 is delivered to the user via the network 108. In the implementation shown, the image 422 to be edited has retained an applied filter from the previously installed filter pack. However, the various packs can be installed in various orders, or only one pack may be installed. A benefit to the user of having multiple packs is that the user can create highly customized images.

In the implementation depicted, the image 422 with the previously applied filter is shown and takes up most of the screen. Various sticker options 424, 426, 428 are shown below the image 422. These may be previously available sticker options from the application, or may be the new options made available by the pack installation. The user may scroll left or right for more sticker options. The new sticker options may be designated by, for example, the vertical theme name near the new options.

As shown in both FIGS. 4B and 4C, stickers 424, 426, 428, 442, 444, 446 can be various kinds of art, designs, text, or images. FIG. 4C shows an example of several stickers 448, 450 imposed on the user's image 422. The stickers 448, 450 may be selected in various manners. For example, the user may click on a sticker 446 below the image 422, and a duplicate sticker 450 may appear somewhere on the image 422. Then, the user may be able to drag the sticker 450 to a different desired location on the image 422. Alternatively, the user may select a sticker 446 from below the image 422 by dragging it from its location below the image 422 onto the desired location on the image 422. In that case, a duplicate sticker 450 may appear in the place of the selected sticker, in order to provide more than one of the same sticker to the user. Alternatively, the motion of selecting sticker from below the image 422 may instantly create a duplicate sticker 450 of the one selected to be placed on the image 422.

In the implementation depicted, users can alter various aspects of original stickers. For example, a user may enlarge, make smaller, or rotate a given sticker 450. In the implementation depicted, there are controls 452 surrounding one of the stickers 450 that give users the ability to delete or enlarge the sticker 450. It is contemplated that users may be able to alter stickers in other ways, such as to edit text, to change colors, alter transparencies, or to place stickers in front or behind other images. In the implementation depicted, the previewed image 422 has one enlarged text sticker and two originally-sized stickers that are duplicates of each other. A user may select zero, one, or multiple stickers for any given image. As in FIG. 4B, the user has the option to apply the image editing content or cancel it.

Figure 5B:
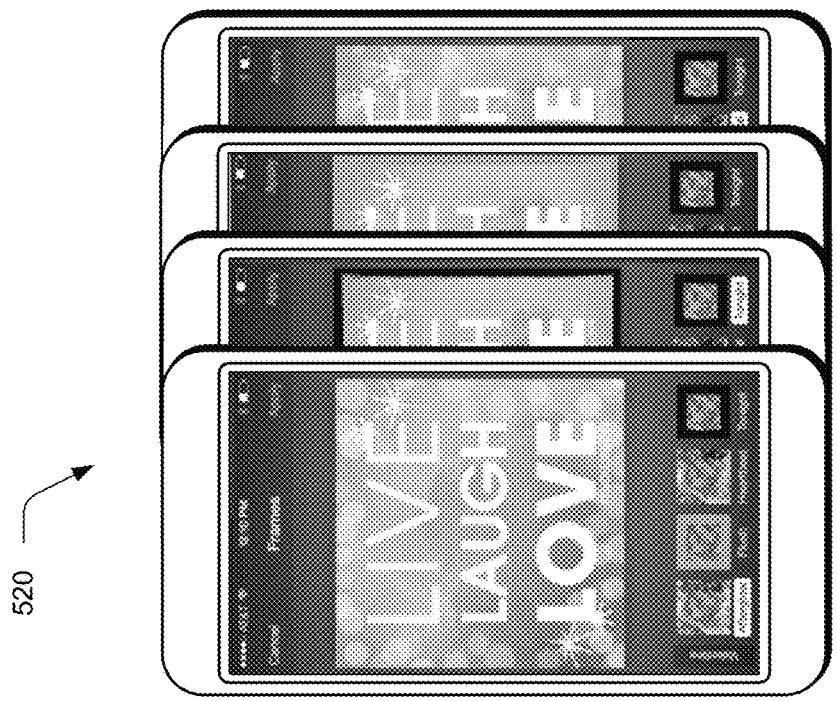
FIG. 5B shows four side-by-side comparison options for frames.
Figure 5A:
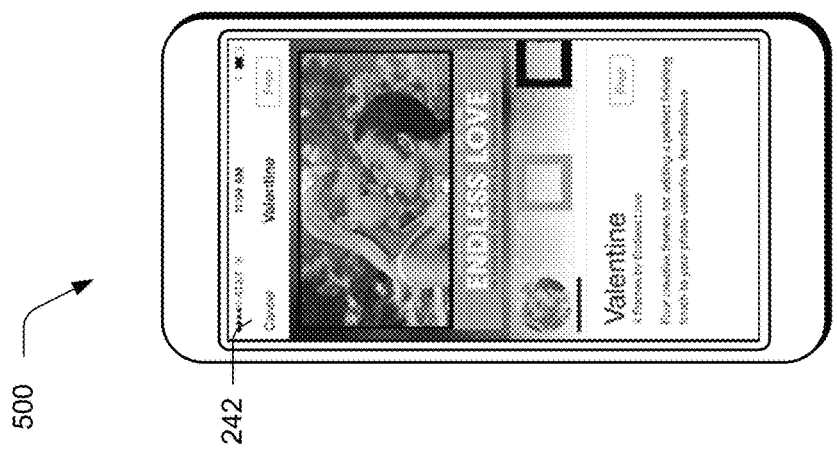
FIG. 5A shows an install screen of the advertising image editing content, specifically depicting an install screen for frames.

Referring now to example implementations 500, 520 of FIGS. 5A-5B, a process is shown for installing, previewing, and applying a pack of image editing content in a similar manner as the processes shown in FIGS. 3A-3B and 4A-4C. In the implementation shown, the pack is for "frames." Frames are generally digital images that surround or encapsulate a middle part of an image in some aspect. A frame can include borders, shading, patterns, or other effects that mostly apply to edges of an image.

FIG. 5A shows an install screen 242 for frames that is similar to install screens for filters and stickers shown in FIGS. 3A and 4A. The main advertisement is displayed on top, the main advertising image thumbnail and available frame option thumbnails are shown below the main advertisement. The theme name of the advertising campaign is shown below the thumbnails. Additionally, below the thumbnail options is a description of the frames. The description of the frames in the implementation depicted can be created by the advertiser, and include brand messaging consistent with the experience the advertiser intends to convey to the user.

FIG. 5B shows side-by-side comparisons of frame options being previewed on an edited image. In the implementation depicted, the edited image has a filter and several stickers applied from previously installed packs. However, a user may install this frame pack without installing other packs. The frame images in this implementation are selected by the advertiser to maintain imagery that is consistent with the brand messaging of the advertisement. Advertisers may select particular colors, shapes, and designs of frames that are consistent with the experience the advertiser intends to convey to the user.

Figure 6:
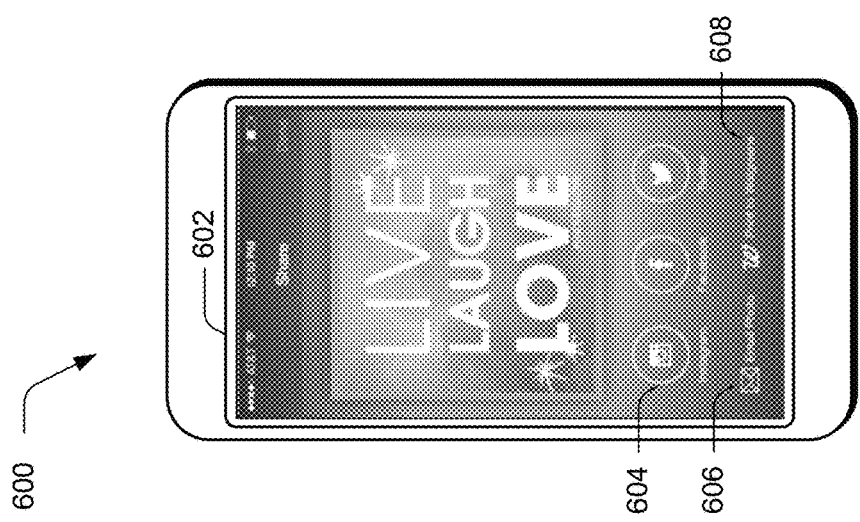
FIG. 6 shows a screen of a mobile app that has options for a user to upload images to social media or to share them in alternative ways.

FIG. 6 depicts an example implementation 600 showing a final version of a user's image with multiple types of image editing content 126 applied. The image is shown in the context of a screen from which the user can share a final version of the image 602. The user has several options though which to share a finished image. The image 602 can be shared on social media sites 604, saved to the device itself, emailed 606, or printed. In the implementation depicted, there is an option 608 to send to a printing company who is an advertiser. This functionality creates an opportunity to include a different advertiser than the one that provided the image editing content 126. Because the user is still engaged in the creative process, and is invested in the final product, the new advertiser is still integrated with the creative process. Introducing a convenient option for printing or otherwise creating the image in physical form provides a benefit to the user. The option also creates a revenue opportunity for the advertiser and possibly others involved in the process.

Figure 7:
FIG. 7 shows five examples of images edited with multiple advertising image editing content.

FIG. 7 depicts an example implementation 700 showing various examples of images edited with multiple forms of advertiser-provided content. Because of the multiple options available within each pack, users can create virtually unlimited variations of edited images within the theme of one advertising campaign.

In the examples depicted in FIGS. 6 and 7, some of the final images include a hashtag (the symbol "#") followed by a phrase associated with the advertising campaign. Such "hashtags" are commonly used on social media sites to allow those sites' programs to aggregate and track instances of the same hashtags. Advertisers and promoters of products, services, and brands often try to encourage users of social media sites to use hashtags associated with the products, services, and brands they are promoting. It is contemplated that when an image edited with advertising image editing content is shared on certain social media sites, metadata including hashtags may be included with the shared image.

Metadata is generally a group of fields that describe attributes of content, and other examples of metadata as contemplated by this disclosure will be described presently. If metadata including hashtags is present when the edited image is uploaded to certain social media sites, the image may automatically be aggregated with corresponding hashtags. It is contemplated that the hashtag does not have to visibly appear in the edited image itself in order to be contained within the metadata. A benefit of including hashtags in metadata is that users who search for or track a particular hashtag will see shared images that have been edited with the associated advertising campaign in an application. Consumers can benefit by accessing content that is thematically consistent with their search, and advertisers can benefit by have more instances of their hashtags being used.

Regarding content metadata, content itself, as described herein, can be any type of data used by the device and displayed to the user. This can include the varieties of content described above, such as user images, filters, stickers, frames, effects, and app images. The metadata associated with each type of content describes attributes of the content. For example, in addition to hashtag metadata, other metadata can include a name, a description, whether the content is free, the location from which the content was obtained, an associated URL, the user associated with the content, and other attribute descriptions. Content itself, as described previously, may be any type of data, but it may be grouped into categories. For example, one "set" of content can be all the content associated with one particular ad campaign.

Figure 8C:
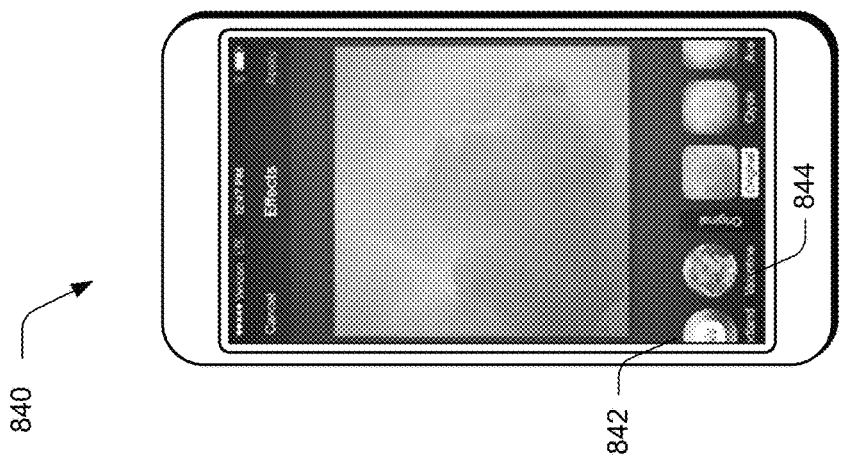
FIGS. 8A, 8B, 8C depicts example implementations of techniques usable to access and promote the advertising image editing content.
Figure 8B:
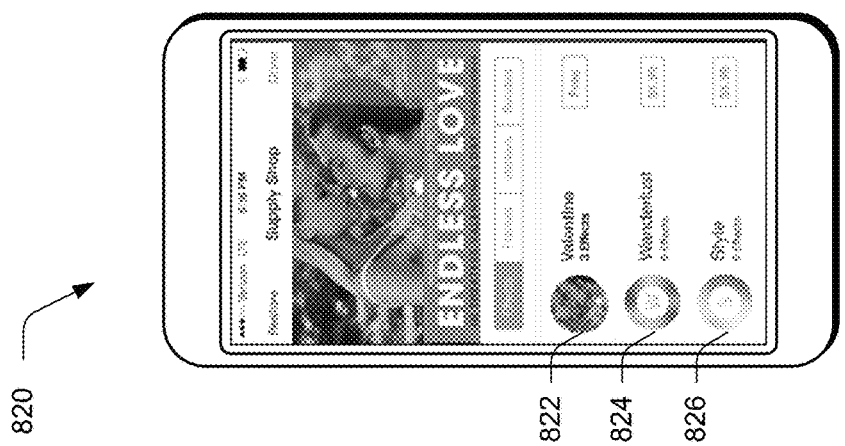
Figure 8A:
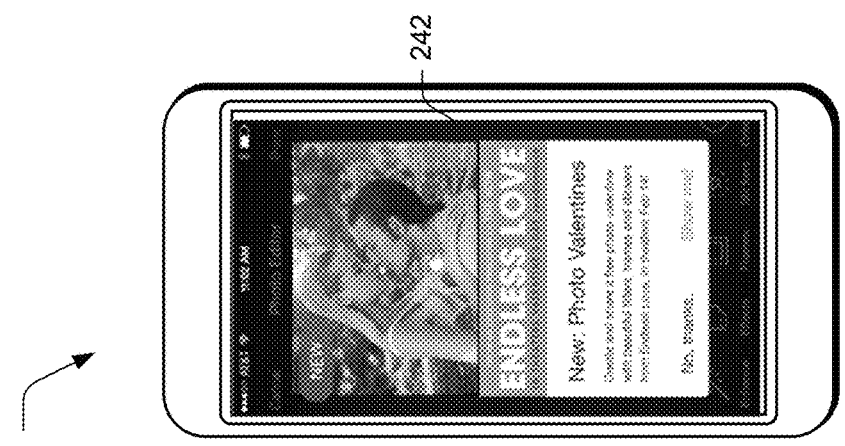

FIGS. 8A, 8B, 8C depicts example implementations 800, 820, 840 of techniques usable to access and promote the advertising image editing content 134. FIG. 8A depicts a promotion option in which the install screen 242 is configured as interstitial (e.g., situated within) a user interface of the client device 104. FIG. 8B depicts a shop promotion option in which the advertising image editing content 822 is included with image editing content 824, 826 that is made available via an online store. FIG. 8C depicts a tool tray 842 promotion option in which the advertising image editing content 844 is included in a tool tray from which a user may select image editing content 126 as well as advertising image editing content 134 as described above. A variety of other examples of access to advertising image editing content 134 are also contemplated without departing from the spirit and scope of the techniques described herein.

Figure 9:
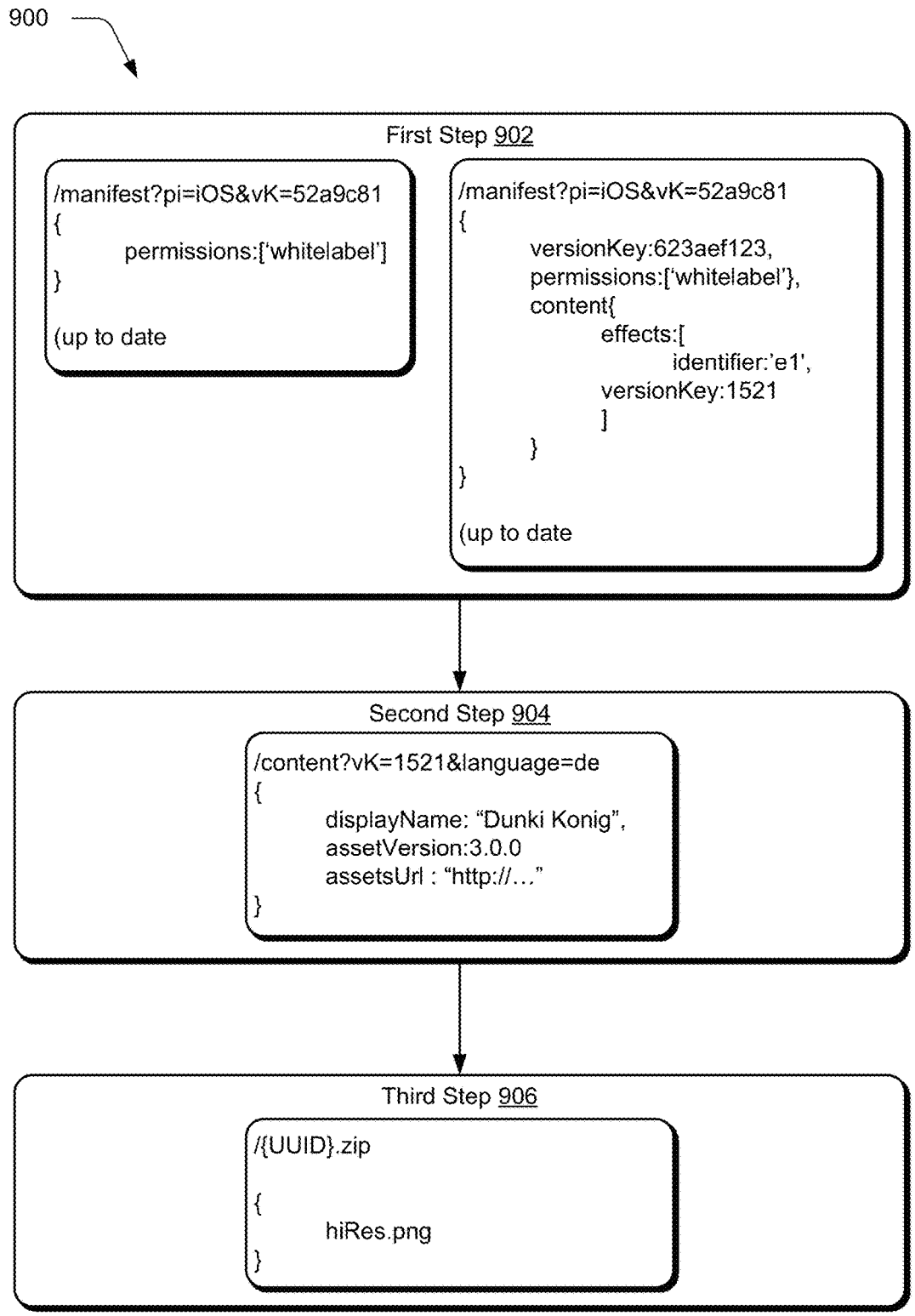
FIG. 9 is a schematic diagram illustrating implementations of the methods described for accessing advertising image editing content.

Referring now to FIG. 9, shown is a schematic diagram 900 depicting an implementation of the system and method used to implement one or more of the processes described above as first, second, ant third steps 902, 904, 906. It is contemplated that advertising campaigns run for a set period of time and then expire, and that new advertising campaigns replace old ones. An aspect of one implementation of this disclosure is that an application can receive new advertising campaigns and their associated image editing content without the need for the user to update the app. FIG. 9 depicts a content delivery system that implements the delivery of new content to the application.

First, within an image editing application, there exists a Software Development Kit (SDK) for the application. Any instance of an SDK within an appropriate image editing app is referred to herein as a "client." In the first step 902, a client makes a request to a Content Delivery System (CDS). A CDS can have several functions, including storing content and information about the content (such as metadata), maintaining content, executing code, and delivering content to clients or devices. The CDS can be, for example, a physical or virtual server, a cloud server, hardware, or software.

In an implementation, a CDS contains a "manifest," which is a list of what content or sets of content are available to clients for display or download. A manifest may list sets of content according to various criteria. For example, the manifest may list advertising campaigns in the order in which they were launched, in the order they are set to expire, or in some other kind of priority ranking system. A list of content in a manifest may determine which content gets delivered to a client or a device, and when it gets delivered. When a CDS contains a manifest for a client to access, the CDS can be referred to as a "manifest endpoint."

When a client makes a request to the CDS, the client does so by presenting a set of "scope parameters," or information about the client. Scope parameters include information about what kind of device the client is on, the operating system, the platform, the location (such as country) of the client, information about the user, and version of the SDK. Scope parameters can include any useful information about the requesting client. Two particular scope parameters are the apiKey and the versionKey. The apiKey refers to an Application Program Interface (API) and its associated identifying information (key) to match at the point of the CDS. In general, apiKeys allow an interface between two kinds of software. In the context of one implementation of the techniques described herein, the apiKey allows the interface between the client and the CDS or manifest endpoint. That is, the client and the CDS have matching apiKeys. A versionKey refers to identifying information regarding the latest version of content that exists on the client.

The scope parameters of a given client affect what content the client will be able to receive from the CDS. For example, certain advertising image editing content 134 (available as listed on the manifest) may only be available to users in a specific country or on a specific kind of device. As another example, other advertising campaigns may only be available to users who are known to fall within specific demographic categories.

The versionKey associated with the client may or may not match the versionKey of the manifest. If the versionKey associated with the client does match the versionKey of the manifest, then the client is up-to-date with the latest version of the content available on the manifest. This matching versionKey can indicate, for example, that the client has received the latest ad campaign and associated image editing content 126, and no newer content exists. The client then makes no further requests for a certain period of time. It is contemplated that the client can be instructed to make new requests at specified intervals of time.

If the versionKey of the client does not match the versionKey of the manifest, then the client receives a manifest containing content available for the particular client's set of scope parameters. A manifest itself can have its own versionKey, and individual set of content can contain its own versionKey. For example, a set of content can comprise one particular ad campaign, and that set can have its own versionKey. Any mismatch between versionKeys can result in a manifest being delivered to the client.

When the client receives the manifest, the client can match up versionKeys for sets of content with versionKeys for previously downloaded sets of content. If a versionKey from the manifest does not match a versionKey that a client has previously downloaded, the mismatch could indicate that content from the manifest is new or had been modified from a previous version.

When the client identifies that there are one or more mismatched versionKeys, the client makes another call to the CDS, in one implementation of the disclosure. This call from the client can be a request, and may include information such as scope parameters as previously described, the versionKey(s) requested, and request language for specific content metadata. This request would allow the client to request content metadata related to a particular ad campaign, for example. It is contemplated that in some implementations, that the request call can take place concurrently with the initial client call to the CDS, and be consolidated into a single call.

The content metadata of a particular set of content, like an advertising campaign, can include data to access "assets." Assets are raw data regarding the content, as differentiated from metadata, and can include, for example, thumbnail images, effects and filter processors, text, and code for implementing content.

When the client requests data to access assets, that data can include an "asset URL" and an "asset versionKey." An asset URL can be a URL from which assets are available for download. The asset URL may be provided by various sources, such as the app developer, the owner of an advertised brand, or any other party that has a role in providing assets for an application. An asset versionKey can exist on the asset URL. The client can also have an asset versionKey of the assets previously downloaded to compare to a versionKey at the asset URL. If the asset versionKeys do not match, the mismatch may trigger the client's download the new assets. The downloaded assets can be in the form of a zip file, or in another convenient file format.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present techniques describe herein, further discussion of which is included below in the Example System and Device section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

FIG. 10 depicts a procedure 1000 in an example implementation in which application integrated advertising display control techniques are described. In one or more implementations, a request is detected, which is received by the one or more computing devices from a client device via a network, for receipt of one or more image editing content packages that are branded to correspond to one or more advertisers (block 1002). The one or more image editing content packages include functionality usable as part of an image editing process to alter appearance of pixels in an image but not replace the pixels or functionality usable to supplement additional pixels to the image without replacing the pixels in the image (block 1004). For example, filters may be used to alter an appearance of pixels without replacing the pixels, e.g., overlaying on object "over" the pixels. In another example, frames are usable to supplement pixels in the image without replacing the image, such as to define a boundary around all or a portion of the image. Inclusion of functionality that is used to replace pixels, e.g., "stickers" may also be included as part of the image editing content package.

Responsive to the detecting by the one or more computing devices, streaming is controlled of the one or more content packages that are branded to correspond to the one or more advertisers via the network for receipt by the client device (block 1006). The service manager module 124, for instance, may stream the image editing content 126 that includes advertising image editing content 124 as part of image editing content packages over the network 108 for use by the image editing module 120 of the client device 104.

Figure 11:
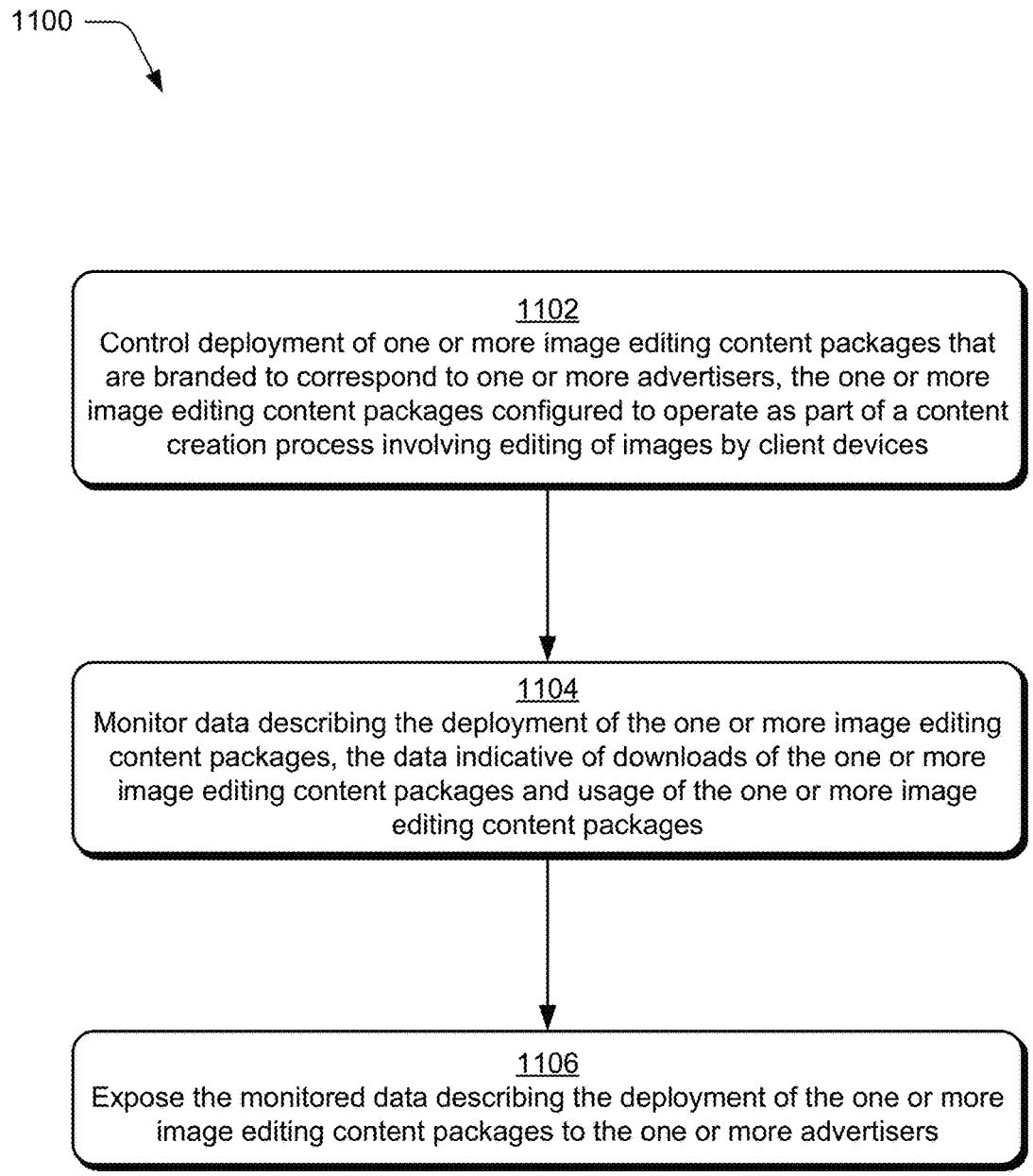
FIG. 11 is a flow diagram depicting another procedure in an example implementation describing application integrated advertising display control techniques.

FIG. 11 depicts another procedure 1100 in an example implementation in which application integrated advertising display control techniques are described. In this example, a system is described of application integrated advertising display control includes one or more computing devices having a service manager module 124 implemented at least partially in hardware to perform operations. The operations include controlling deployment of one or more image editing content packages that are branded to correspond to one or more advertisers. The one or more image editing content packages are configured to operate as part of a content creation process involving editing of images by client devices (block 1102). For example, a branded version of image editing content 126, referred to as advertising image editing content 134, may include logos, trademarks, various images, and promotional messages that are associated with things to be advertised, such as products, services, media or any other advertised subject matter. The inclusion of advertising image editing content 134 as part of an image editing experience allows advertisers to communicate brand messages through several steps that engage the user in a creative process.

The operations also include monitoring data describing the deployment of the one or more image editing content packages. The data is indicative of downloads of the one or more image editing content packages and usage of the one or more image editing content packages (block 1104). The service manager module 124, for instance, may embed functionality that is usable to aid tracking usage, such as to form reports by the client device 104 for receipt by the service manager module 124 when the advertising image editing content 134 is used locally by the device. This monitoring may also include tracking the deployment of the packages by the service manager module 124 itself, e.g., when streamed to the client device 104.

The operations further include exposing the monitored data describing the deployment of the one or more image editing content packages to the one or more advertisers (block 1106). The service manager module 124 of the service provider 102 may then expose this data via the network 108 to the advertising service 130 such that the advertiser is made aware of the deployment of the advertising image editing content 134, e.g., to determine success of failure of an advertising campaign that includes the content, suggest changes, and so forth. A variety of other examples are also contemplated as described above.

Example System and Device

Figure 12:
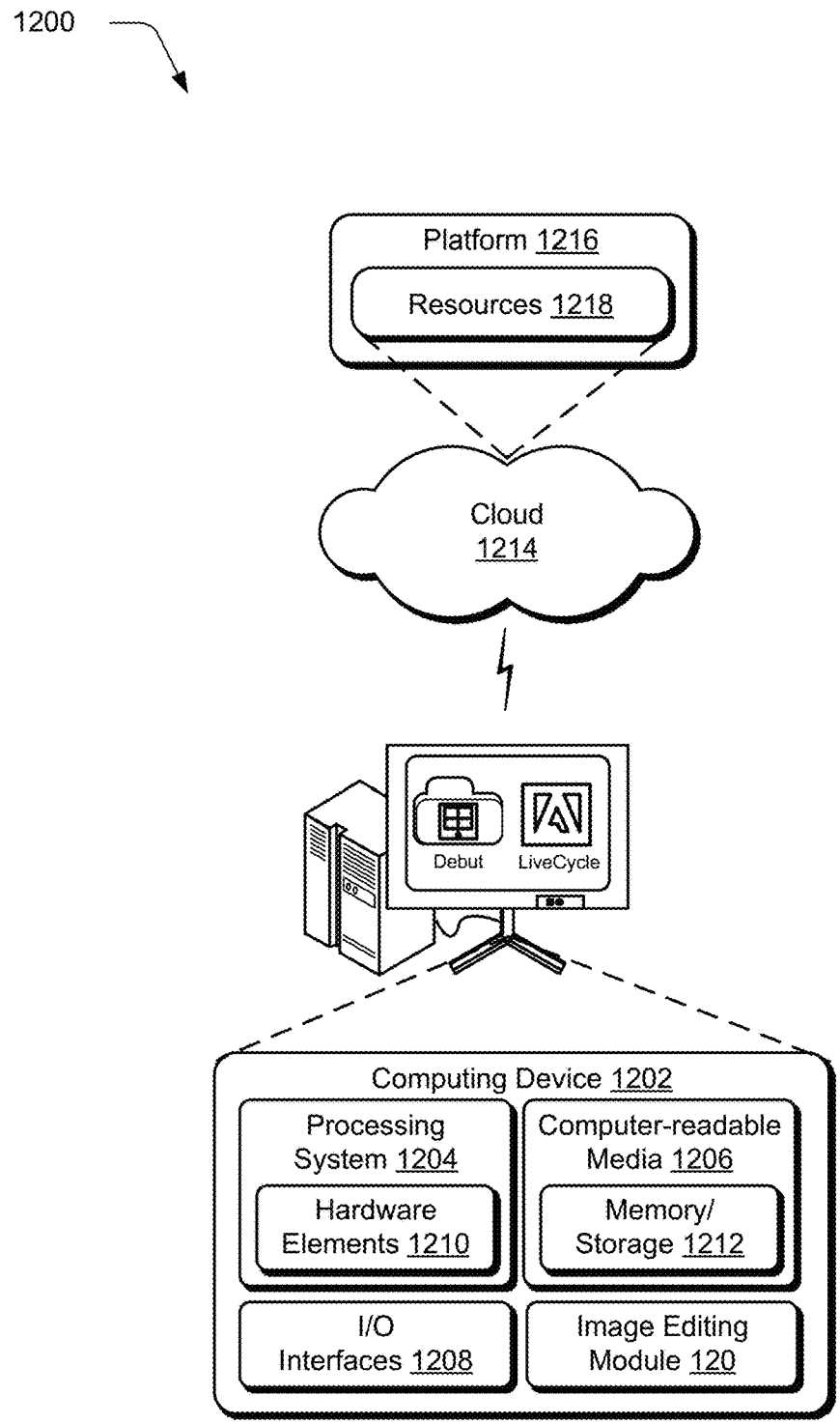
FIG. 12 illustrates an example system including various components of an example device that can be implemented as any type of computing device as described and/or utilize with reference to FIGS. 1-11 to implement implementations of the techniques described herein.

FIG. 12 illustrates an example system generally at 1200 that includes an example computing device 1202 that is representative of one or more computing systems and/or devices that may implement the various techniques described herein. This is illustrated through inclusion of the image editing module 120. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device implementation, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of application integrated advertising display control, the method comprising:
    displaying, on a display of a client device, an install screen including main advertisement content providing branding associated with a theme for an image editing content package that is branded to correspond to one or more advertisers;
    requesting, by the client device via a network, the image editing content package, the image editing content package being configured to enable creation of enhanced images using image editing content contained in the image editing content package;
    receiving, by the client device, the image editing content package; displaying, by an application of the client device, selectable editing options which, when selected, cause image editing content to be applied to an image to provide an enhanced image, the selectable editing options including:
        a first selectable editing option included as part of the application; and
        a second selectable editing option included as part of the image editing content package, wherein the displaying the second selectable editing option includes displaying an indication of the theme associated with the second selectable editing option; and
    responsive to a selection of the second selectable editing option, applying the image editing content contained in the image editing content package.

2. A method as described in claim 1, wherein the second selectable editing option includes one or more image editing filters that are branded to correspond to the one or more advertisers.

3. A method as described in claim 1, wherein the second selectable editing option includes one or more frames that border pixels and that are branded to correspond to the one or more advertisers.

4. A method as described in claim 1, wherein the image editing content package further includes functionality usable to replace pixels in the image that is branded to correspond to the one or more advertisers.

5. A method as described in claim 4, wherein the functionality usable to replace pixels includes one or more stickers.

6. A method as described in claim 1, wherein the image editing content package is configured for consumption by an image editing module incorporated as a third-party plugin by the application.

7. A method as described in claim 1, wherein displaying the indication of the theme includes displaying a theme name proximate to the second selectable editing option.

8. A method as described in claim 1, wherein the displaying the selectable editing options further includes separating the first selectable editing option from the second selectable editing option based on the indication of the theme.

9. A method as described in claim 1, wherein the selectable editing options further include a plurality of additional editing options included as part of the image editing content package, and wherein the indication of the theme is additionally associated with the plurality of additional editing options.

10. A system of application integrated advertising display control, the system comprising:
    one or more computing devices having a service manager module implemented at least partially in hardware to perform operations comprising:
        controlling deployment of one or more image editing content packages that are branded to correspond to one or more advertisers, the one or more image editing content packages being configured to enable creation of enhanced images using image editing content contained in the one or more image editing content packages, the one or more image editing content packages being configured to provide branding by applying said image editing content to main advertisement content to provide selectable editing options which illustrate what the image editing content looks like when applied to an image and which, when selected, causes the image editing content to be applied to an image to provide an enhanced image, the selectable editing options configured to be provided in addition to other selectable editing options included as part of an application;

monitoring data describing the deployment of the one or more image editing content packages, the data indicative of downloads of the one or more image editing content packages and usage of the one or more image editing content packages; and exposing the monitored data describing the deployment of the one or more image editing content packages to the one or more advertisers.

11. A system as described in claim 10, further comprising embedding tracking functionality to be included as part of the image editing content packages that reports the usage of the one or more image content packages by respective client devices as part of the monitoring.

12. A system as described in claim 10, wherein the monitoring is performed at least in part based on requests received for the one or more image editing content packages.

13. A system as described in claim 10, wherein the controlling deployment is performed by streaming the one or more image editing content packages to respective client devices.

14. A system as described in claim 10, wherein the one or more image editing content packages include:
  functionality usable as part of an image editing process to alter appearance of pixels in an image but not replace the pixels; or
  functionality usable to supplement additional pixels to be added to the image without replacing the pixels in the image.

15. A system of application integrated advertising display control, the system comprising:
  an image editing module implemented at least partially in hardware, the image editing module configured to:
    request an image editing content package that is branded to correspond to one or more advertisers, the image editing content package being configured to enable creation of enhanced images using image editing content contained in the image editing content package;
    receiving the image editing content package;
    displaying selectable editing options included as part of the image editing content package which illustrate what the image editing content looks like when applied to an image and which, when selected, cause the image editing content to be applied to an image to provide an enhanced image, the selectable editing options displayed in addition to one or more other selectable editing options included as part of an image editing application;
    responsive to selection of a selectable editing option, altering or supplementing an appearance of pixels in an image without replacing the pixels.

16. A system as described in claim 15, wherein the altering or supplementing includes utilizing one or more image editing filters that are branded to correspond to the one or more advertisers.

17. A system as described in claim 15, wherein the altering or supplementing includes utilizing one or more frames that border the pixels and that are branded to correspond to the one or more advertisers.

18. A system as described in claim 15, wherein the one or more image editing content packages further include functionality usable to replace pixels in the image that is branded to correspond to the one or more advertisers.

19. A system as described in claim 18, wherein the functionality usable to replace pixels includes one or more stickers.

20. A system as described in claim 15, wherein the displaying the selectable editing options includes displaying an indication of a theme associated with the selectable editing options.

* * * * *